(No Model.)

J. BANIGAN.
RUBBER RING.

No. 250,871. Patented Dec. 13, 1881.

Witnesses.
Phil N. Hale
Wm H. Bates.

Inventor,
Joseph Banigan,
by W. B. Hale.
for Joseph A. Miller, Atty.

UNITED STATES PATENT OFFICE.

JOSEPH BANIGAN, OF PROVIDENCE, RHODE ISLAND.

RUBBER RING.

SPECIFICATION forming part of Letters Patent No. 250,871, dated December 13, 1881.

Application filed May 27, 1881. (No model.)

*To all whom it may concern:*

Be it known that I, JOSEPH BANIGAN, a citizen of the United States, residing at Providence, in the county of Providence and State of Rhode Island, have invented a new and useful Improvement in Flexible Rubber-Surfaced Rings, of which the following is a specification.

The object of my invention is to give increased strength to this class of rings, while preserving their surface elasticity. Such rings have heretofore been made entirely of india-rubber, and so made will stretch too much for general use in the arts when subjected to strain, and are easily broken.

In my improvement the rubber surface tends to preserve the shape of the ring, to protect it from the effects of moisture, and renders it agreeable to the grasp of the hand when used as a pull-ring, and also capable of use as a teething-ring, while an inner core of fibrous cord enables it to withstand great strain.

Figure 1:
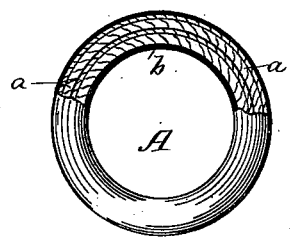
Figure 2:
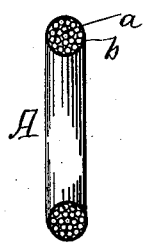
Figure 3:
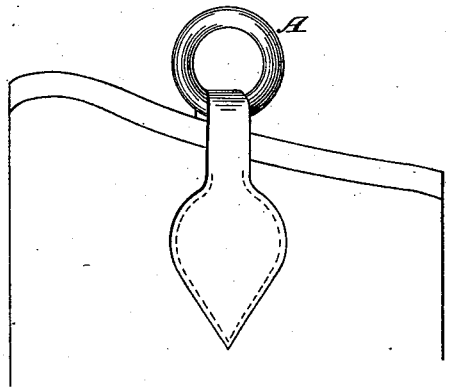

In the accompanying drawings, Figure 1 is a side view of my improved ring, with part of the rubber surface removed to show the core. Fig. 2 is a cross-section of the same. Fig. 3 shows the ring applied to use as the pull-ring of a boot.

In constructing my improved ring A, I first form a core of fibrous cord consisting of several spirals or coils in one piece, as shown at $a$, Fig. 1, and then cover this core with a covering, $b$, of sheet or plastic india-rubber by any of the well-known modes. When sheet-rubber is used I may vulcanize it either before or after placing it on the core. Forming the core of several spirals or coils in one piece gives it greater strength, and renders it more flexible than would be a large single cord, and also renders unnecessary the fastening together of the ends of the cord.

What I claim is—

A ring composed of a core formed of several spirals or coils of fibrous cord in one piece and a complete covering of india-rubber.

JOSEPH BANIGAN.

Witnesses:
WM. L. COOP,
J. A. MILLER, Jr.